Aug. 19, 1941.    A. P. WINTER    2,253,004
WEIGHING SCALE DUMP
Filed Feb. 20, 1939
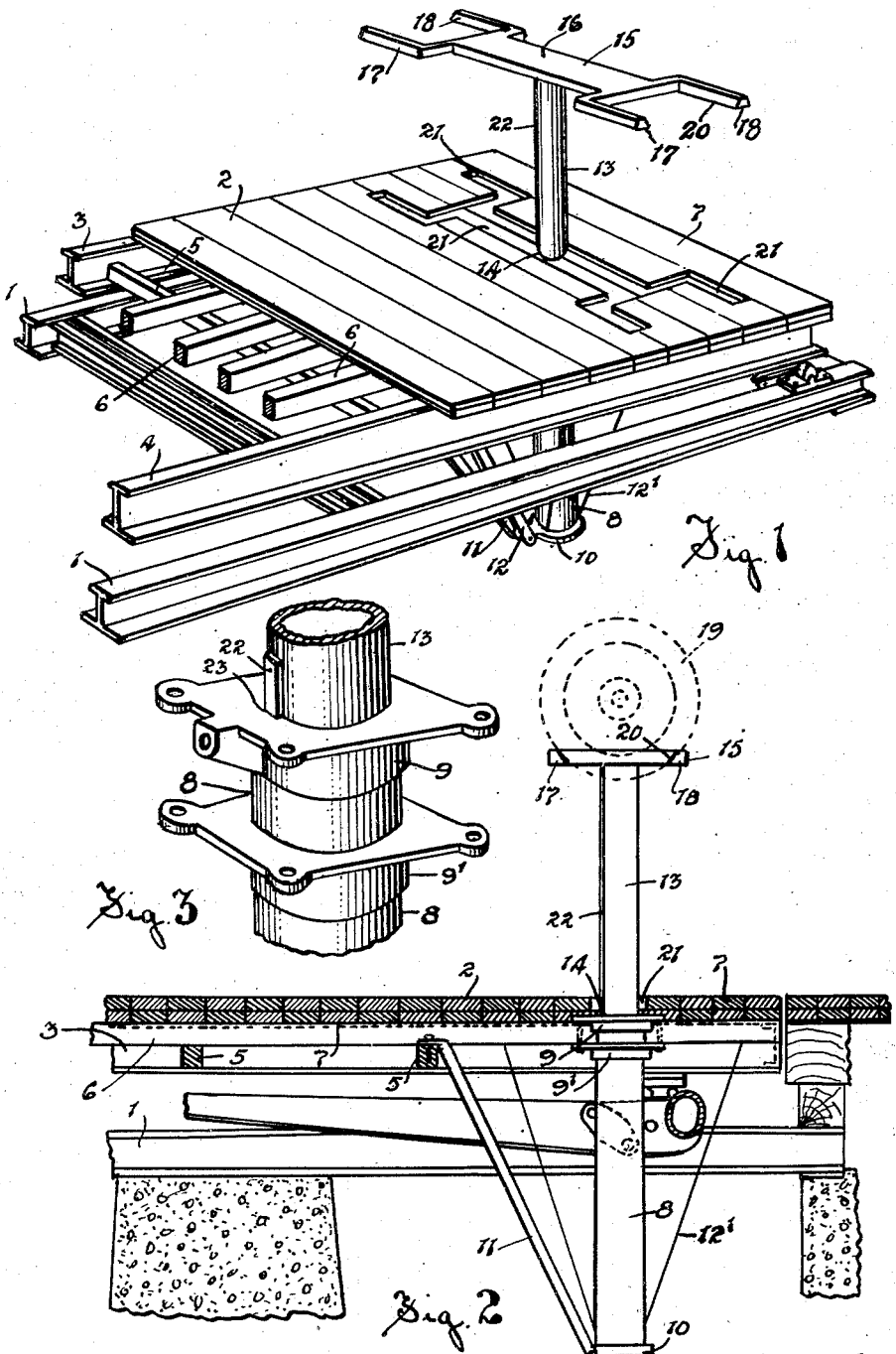

Patented Aug. 19, 1941

2,253,004

UNITED STATES PATENT OFFICE 2,253,004

WEIGHING SCALE DUMP

August P. Winter, St. Vital, Manitoba, Canada

Application February 20, 1939, Serial No. 257,348

1 Claim. (Cl. 214—46.5)

The invention relates to improvements in weighing scale dumps, the present application being a continuation-in-part of my prior application number 207,024, filed the 10th day of May 1938 for Receiving units.

In prior practice, as far as I am aware, and where a platform suspended cylinder and piston are used to raise the vehicle wheel support, there has always been a relatively large opening exposed in the scale platform when the wheel support was raised, and this was very undesirable, as it necessitated the use of a guard to prevent animals from backing into the exposed opening and causing accident, and also lead to the practice of utilizing the guard to prevent rotary movement of the wheel support as it rose.

The object of the present invention is to provide a construction wherein there is no unguarded opening in the scale platform when the wheel support rises, and which also permits utilizing a simple means for preventing rotary movement of the piston and consequently the wheel support, in relation to the cylinder when the wheel support is raised. Obviously such an arrangement will do away with the possibility of accident to animals and will also dispense with the necessity of a guard member.

Further according to my construction the wheel support lies with its upper face flush with the upper face of the scale platform, when in the fully down position, so there is no obstruction offered to passing vehicles.

Further the wheel support which I provide has its end forked so that when raised, the forks engage the circumferences of the overlying wheels and lifts them and at the same time provides a very efficient means for preventing any shifting movement of the wheels as the support rises.

With the above more important objects in view, the invention consists essentially in the arrangement and construction of parts hereinafter described, reference being had to the accompanying drawing in which:

Fig. 1 is a perspective view showing my invention installed in a weighing scale.

Fig. 2 is a vertical longitudinal sectional view through the scale, certain parts being shown in side elevation.

Fig. 3 is a perspective view of the cylinder head casting and other associated parts.

In the drawing like characters of reference indicate corresponding parts in the several figures.

The main frame 1 of the scale supports the scale platform 2, the details of the support forming no part of the present invention, as they are fully shown and described in the prior application hereinbefore mentioned. The scale platform presents side beams 3 and 4, interconnecting cross beams 5, spaced intermediate deck supporting beams 6 and layers of cross planks 7 carried by the side and intermediate beams.

The cylinder 8 has the upper end provided with a receiving cylinder head casting 9, permanently secured thereto and a flanged sleeve 9' therebelow, and the lower end closed by an applied cap 10 through which the operating fluid, such as compressed air is admitted to the lower end of the cylinder in the well known manner.

The upper end of the cylinder is entered between the two central beams 6 adjacent one end of the scale platform and the cylinder head casting 9 is rested on said beams and is bolted through such beams to the flange of the sleeve 9', which latter flange lies against the under side of the beams. In this way the upper end of the cylinder is permanently secured to the scale platform in a location below the planks forming the deck thereof.

A pair of brace bars 11 and 12 extend between the cap 10 and the overlying scale platform structure and a plurality of the rods 12' also connect the cap with the overlying structure.

A piston or plunger 13 is slidably mounted in the cylinder and has the upper end thereof passing freely through an opening 14 provided in the planks. The upper end of the cylinder has a wheel support permanently secured thereto which passes transversely of the scale platform and in the fully down position has its upper face flush with upper face of the scale platform, so that it offers no obstruction to passing vehicles.

In the present instance this wheel support 15 is in the form of a cross bar 16 having similar forked ends 17 and 18, the ends being spaced sufficiently far apart to provide a cradle for engaging with, lifting and locking the superimposed front wheel 19 of a vehicle when the piston rises, and as shown in Fig. 2. The inner sides of the forks are slanted as shown at 20 to conform to the circumference of the wheels.

The deck planks of the platform are arranged such that a recess 21 is provided in the upper face of the platform, the recess being complementary to the wheel support, so that when in the fully down position the wheel support is entirely received in the recess with its upper face flush with the upper face of said platform.

The piston or plunger is prevented from rotating in the cylinder by a lengthwise extending key 22 secured permanently to the piston and slidably received in a slot or key-way 23 provided in the cylinder head casting 9. (See Fig. 3.)

I might here point out that in platforms where a hoist cylinder has been used for lifting a support for the front end of vehicles to be dumped by contact with the wheels or runners thereof, a rather deep excavation has been provided in the ground underneath the support to freely receive the cylinder and its braces. In all prior installations of which I am aware, there has been an opening of sufficient dimensions exposed in the platform when the support was raised, to permit of draft animals or persons falling a considerable distance, bodily through the platform and to the bottom of the underlying excavation and being seriously injured. Furthermore the only provision made to avoid such an accident in such an assembly has been to provide a horse guard such as disclosed in several prior patents such as in the Erickson Patent 1,518,780 dated December 9, 1924.

Obviously with my arrangement no horse guard is needed when the plunger or piston is actuated to lift the support and dump the load for the reason that the effective platform surface is retained and therefore no person or animal can fall through into the excavation.

While I have herein shown a specially designed wheel support I wish it to be distinctly understood that in the broader embodiment of my invention, the wheel support may take any desired form, provided that when in its fully down position its upper surface lies approximately flush with the upper surface of the scale platform to offer no obstruction to a passing vehicle and that when in a raised position it leaves no opening or openings in the scale platform which would be liable to cause injury or accident to a person or animal entering the area thereunder.

What I claim as my invention is:

In combination, a vehicle receiving platform having a ground excavation thereunder, a fluid actuated hoist supported beneath the platform and extending downwardly into the excavation and upwardly into the platform and a support for raising the forward end of the vehicle by contact with the wheels or runners thereof, said support being carried by the upper end of the hoist and being received within a recess provided in the platform to lie, with its upper face approximately flush with the upper face of the platform, in the down position, and the effective platform surface being retained in all raised positions of the support.

AUGUST P. WINTER.